(12) United States Patent
Ou-Yang et al.

(10) Patent No.: US 10,564,894 B2
(45) Date of Patent: Feb. 18, 2020

(54) FREE SPACE PASS-THROUGH

(71) Applicant: Microsoft Technology Licensing, LLC, Redmond, WA (US)

(72) Inventors: Darwin Ou-Yang, Redmond, WA (US); Oleg Kagan, Issaquah, WA (US); Sameer Chetan Saiya, Bellevue, WA (US); Ravinder S. Thind, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/968,178

(22) Filed: May 1, 2018

(65) Prior Publication Data

US 2019/0339901 A1 Nov. 7, 2019

Related U.S. Application Data

(60) Provisional application No. 62/645,725, filed on Mar. 20, 2018.

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0634* (2013.01); *G06F 3/0652* (2013.01)

(58) Field of Classification Search
CPC .................. G06F 9/4401; G06F 11/1469
See application file for complete search history.

(56) References Cited

U.S. PATENT DOCUMENTS 7,480,761 B2    1/2009  Birrell et al.
8,161,321 B2*   4/2012  Zheng ................. G06F 11/1461
                                                  707/674

(Continued)

FOREIGN PATENT DOCUMENTS

CN          102799542 A       11/2012

OTHER PUBLICATIONS

B.Y.Zhao, Ling Huang, J. Stribling, A.D. Joseph, J.D.Kubiatowicz, Exploiting routing redundancy via structured peer-to-peer overlays, 11th IEEE International Conference on Network Protocols. (Year: 2003).*

(Continued)

*Primary Examiner* — Khoa D Doan
(74) *Attorney, Agent, or Firm* — Newport IP, LLC; Han Gim

(57) ABSTRACT

In a first area of a persistent memory, state data is stored that defines a known good state that is operable to launch a computing device to the known good state in response to a reboot. Allocation information indicative of free and allocated portions of the persistent memory is accessed. In response to a write request to the first area of persistent memory, when the write request is to an allocated portion of the persistent memory, the requested write is redirected to a second area of the persistent memory. A record of redirected writes to the second area of persistent memory is updated. When the write request is to a free portion of the persistent memory, the write request is allowed to be executed in the first area of persistent memory. The record of redirected writes is updated with the writes to the second area of persistent memory.

19 Claims, 10 Drawing Sheets

(56) References Cited

U.S. PATENT DOCUMENTS

| | | | |
|---|---|---|---|
| 10,346,320 B2 | 7/2019 | Joshi et al. | |
| 10,353,636 B2 | 7/2019 | Kaushik et al. | |
| 2004/0193658 A1* | 9/2004 | Kawamura | G06F 11/2074 |
| 2005/0027957 A1* | 2/2005 | Page | G06F 12/1425 |
| | | | 711/163 |
| 2006/0047927 A1 | 3/2006 | Xing et al. | |
| 2007/0186070 A1* | 8/2007 | Federa | G06F 12/1425 |
| | | | 711/163 |
| 2010/0318746 A1* | 12/2010 | Troxel | G06F 11/1438 |
| | | | 711/141 |
| 2013/0111163 A1* | 5/2013 | Yang | G06F 21/74 |
| | | | 711/162 |
| 2017/0286234 A1 | 10/2017 | Shulga et al. | |
| 2018/0052740 A1 | 2/2018 | Patwardhan et al. | |
| 2018/0203611 A1* | 7/2018 | Zhou | G06F 3/064 |
| 2019/0340083 A1 | 11/2019 | Ou-Yang et al. | |

OTHER PUBLICATIONS

"International Search Report and Written Opinion Issued in PCT Application No. PCT/US19/021717", dated Jun. 3, 2019, 12 pages.
"International Search Report and Written Opinion issued in PCT Application No. PCT/US19/021716", dated Jun. 3, 2019, 12 pages.
"Notice of Allowance Issued in U.S. Appl. No. 15/968,130", dated Nov. 14, 2019, 9 pages.

\* cited by examiner

FREE SPACE PASS-THROUGH

CROSS-REFERENCE TO RELATED APPLICATIONS

This patent application claims benefit of Provisional U.S. Patent Application No. 62/645,725, filed on Mar. 20, 2018 which is hereby incorporated herein by reference.

BACKGROUND

Embedded or dedicated computing devices may be used in public kiosks, schools, and other public use settings. It is desirable that such devices are not modifiable by users so that the devices are recoverable to a known state when rebooted. For example, a laptop used by students in a school may be allowed to install and load multiple applications and download data. However, once the laptop is restarted, the laptop should be configured to discard user changes and revert to a known state. Such devices may be configured to treat all changes as temporary, discarding all changes when the device is rebooted. It is with respect to these and other considerations that the disclosure made herein is presented.

SUMMARY

A function such as a Unified Write Filter (UWF) may be implemented that allows computing devices to persist a known state across reboots. Such a function may be implemented in various devices such as IoT, embedded, and desktop systems that are used in kiosks or as shared PCs, for example. Such a function may generally be referred to herein as a write filter.

The write filter may be configured to protect the contents of a protected volume on a computing device by redirecting write operations on that volume to an overlay. An overlay may be a virtual representation of the changes to the protected volume. The overlay may be used to accumulate information about the redirected writes to protected volumes on the device. The protected volumes can be of any defined size that is supported by the computing device.

In an embodiment, the overlay does not mirror the entire protected volume, but tracks the redirected writes. In one embodiment, a group of memory blocks may be reserved as the overlay. When a write attempt is made to the protected volume, the write attempt may be redirected to the overlay area. This may be referred to as redirection or data placement.

Because the changes to the protected volumes are stored in the overlay, if these changes are discarded when the computing device is rebooted, the computing device will revert to the state defined by the unmodified data in the protected volumes. This state may be referred to as the known good state.

The overlay may be stored in RAM, or in a pre-allocated file such as a system volume on a persistent memory such as a hard disk. In one embodiment, all information in the overlay is discarded after the computing device restarts or experiences a power loss, regardless of how the overlay is stored. The overlay may be created the first time the file system mounts a volume. Each time that a write attempt is redirected to the overlay, the disk sectors that would be modified are copied to the overlay. When the file system erases or deletes files that do not exist on the protected volume, unneeded clusters may be removed from the overlay and the freed resources returned to the available pool.

One benefit of using the overlay is that the reliability and stability of the computing device may be improved. Furthermore, the wear on write-sensitive media such as solid-state drives may be reduced, thus increasing their usable life.

In an embodiment, the writes to the overlay area are persisted so that when the computing device is restarted, the computing device maintains the changes to the known good state that are persisted in the overlay area. The contents of the overlay are thus preserved and reverted to upon reboot unless the system is manually rolled back to the original known good state.

In one embodiment, a log is maintained where the mapping to the overlay is saved as an index of translations between the original writes to the protected volume and the corresponding redirects to the overlay area. By maintaining and persisting this log, the log may be used to restore the mappings to the overlay area, allowing for the system to revert to the state defined by the information in the overlay area. In an embodiment, the log can be saved in the overlay area. When the device is rebooted, the mappings can be recreated by accessing the log. If it is desired to discard the changes and revert back to the known good state, then the log and its mapping information may be discarded. In one embodiment, the mappings may be treated as uninitialized when rebooted. The contents of the overlay will therefore not be mapped, allowing for reversion to the original known good state.

In an embodiment, an alternate known good state may be defined as a state of the system that includes changes from the known good state. Such an alternate state may be referred to as an anchor or rollback point. When an anchor or rollback point is defined, the changes in the overlay area may be persisted so that when the computing device is restarted, the computing device reverts to the alternate known good state rather than the original known good state.

The new anchor point or rollback point may be defined based on input from the user via an API and UI. In some embodiments, multiple anchor points may be defined, and the user may select one of the defined anchor points as the rollback point that the system will revert to when rebooted. Contents of the overlay as defined by the rollback point will be preserved and reverted to upon reboot unless the system is manually rolled back to the original known good state.

In one embodiment, the rollback feature may be enabled using the log where the mapping to the overlay is saved. If no rollback is established, then the mapping may be discarded and the contents of the overlay are not mapped, allowing for rollback to the original known good state. If a rollback is set, then the log is persisted and used to restore the mappings to the overlay area, allowing for the system to revert to the anchor point defined by the information in the overlay area.

If the size of the overlay approaches or complete uses the maximum overlay size, additional write attempts will fail, returning an error indicating that there is not enough space to complete an attempted operation. If the overlay reaches this state, the computing device may become unresponsive and sluggish, manifest errors, and/or require a restart of the computing device.

In an embodiment, to avoid the overlay from being filled to capacity and thus requiring a reboot, a free space pass-through mechanism may be implemented. The system may determine what memory blocks in the protected volume are actually in use (e.g., allocated) and which blocks are free. When an attempt is made to write to blocks that are free, the write to those blocks are allowed rather than being redirected. In one embodiment, this write information while actually persisted will be treated as uninitialized upon reboot. For example, the next time the device reboots, the blocks in the protected volume that were written to via the pass-through mechanism will be statused as free and their contents will not be preserved. In other embodiments, writes which are passed through may be also described in the log so that on reboot, the passed-through writes can also be restored along with the overlay mappings. By implementing a free space pass-through mechanism, the number of writes to the overlay area can be reduced, thus reducing the likelihood that the overlay area will be filled, and reducing the number of writes to this area of persistent memory.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes systems and methods that enable a computing device to maintain and update a known good state, while improving the operation and efficiency of the mechanisms for doing so. The known good state may refer generally to a user mode operational state that is configured to support a specific operational scenario such as a business function or an educational scenario. An example user mode operational state is a retail application configured to scan a bar code of tagged merchandise and/or credit card information, or an educational configuration for performing research in a specified area. The computing device can maintain data that defines and/or is usable to reenter the user mode operational state when the device is rebooted.

In some embodiments, a computing device may be configured to store the drivers, the OS, and applications along with the user mode operational state data on a first partition that can be protected by a write filter (e.g., MICROSOFT's Unified Write Filter (UWF) and/or Enhanced Write Filter (EWF)). When the computing device is enabled to maintain and update a known good state and enters the user mode operational state, the write filter may be enabled to prevent user activity from altering the drivers, the OS, the applications, and/or the state data that defines the user mode operational state. When the write filter is enabled, data writes that are intended for the first partition are redirected to a memory location, a virtual overlay, a different partition, or any other suitable storage location.

The write filter may be configured to intercept all modifications to any sector on a protected volume. A sector is typically the smallest unit that can be changed on a storage volume. Any time the file system attempts to modify a protected sector, the write filter may instead redirect the sector from the protected volume to the overlay, and then modify the overlay. If an application attempts to read from that sector, UWF returns the data from the overlay, so that the system maintains the appearance of having written to the protected volume, while the volume remains unchanged. The disclosure further describes techniques for persisting the changes accumulated in the overlay. Further, the disclosure describes techniques for allowing a user to define an alternate known good state as a state of the system that includes changes from the known good state.

Figure 1A:
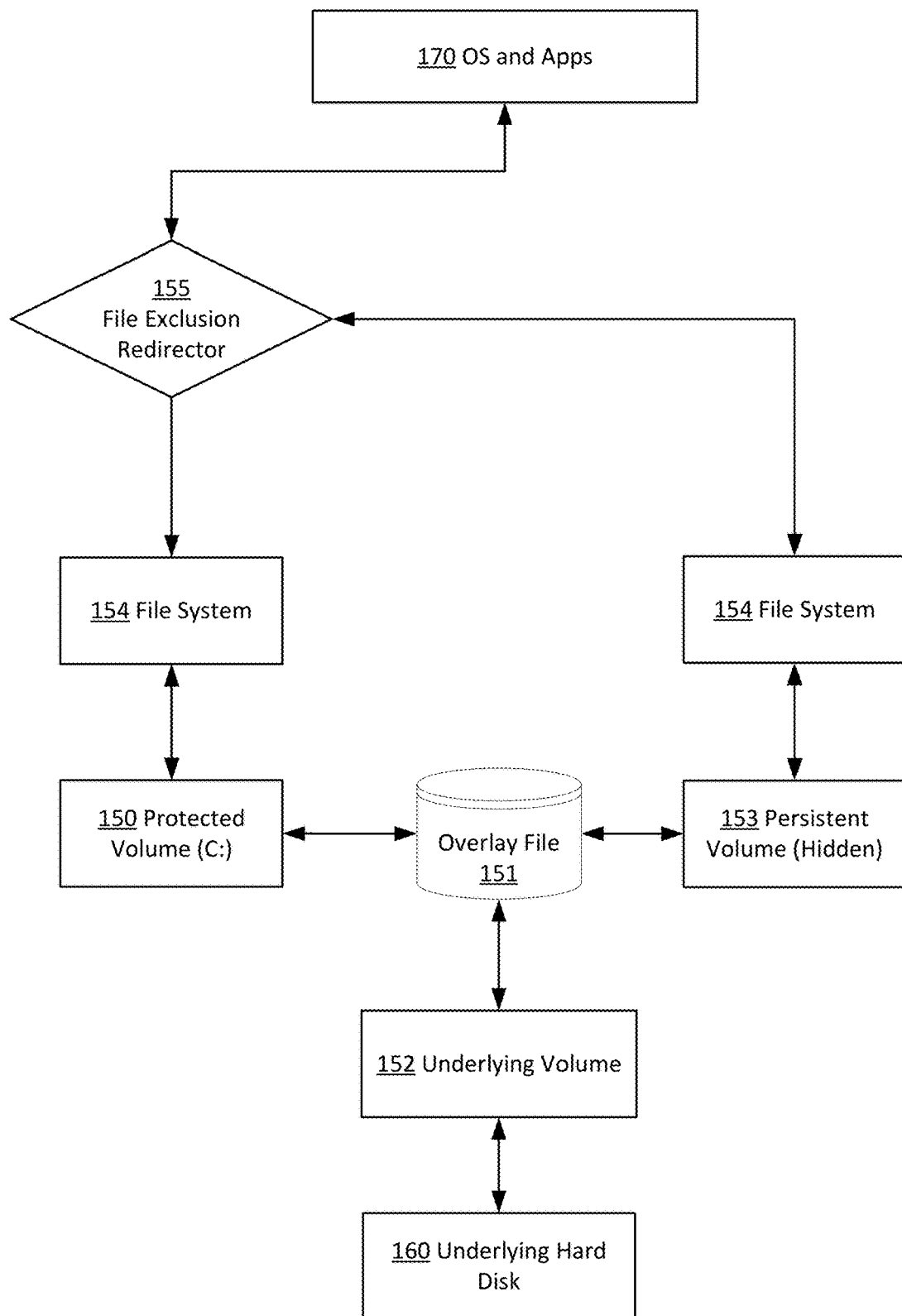
FIG. 1A is an example functional diagram in accordance with the present disclosure.

In one example illustrated in FIG. 1A, the operating system (OS) and applications 170 are provided access to a protected volume 150 (e.g., C:) when the write filter (not shown in FIG. 1A) is invoked. Any writes sent to the protected volume 150 are redirected to an overlay file 151. Any reads sent to the protected volume 150 may be sent to an underlying volume 152 unless those sectors already exist in the overlay file 151, in which case the reads are fetched from the overlay file 151. Underlying volume 152 may reside in underlying hard drive 160. When the system is rebooted, the contents of the overlay file 151 are discarded and any sectors changed since the write filter was invoked are lost. The protected volume 150 is thus returned to the same state as the underlying volume 152.

Continuing with the example in FIG. 1A, the write filter may expose a second copy of the underlying volume 152 which is shown as persistent volume 153 which is hidden from the user. If a read is sent to the persistent volume 153, data is read directly from the underlying volume 152. When a write is sent to the persistent volume 153, data is first read from the existing data sectors from the underlying volume 152 and written into the overlay file 151. Once this old data has been stored in the overlay file 151, the write is allowed to modify the underlying volume 152. If the write filter identifies an opening or creation of any file on the protected volume 150 that matches an excluded filename or path, the file is redirected to the persistent volume 153.

As a further example, suppose an excluded folder "C:\excluded" exists. If :\excluded\excluded_file.txt is opened, then what is actually opened is <Persistent Volume>:\excluded\excluded_file.txt. Furthermore, if "XYZ" is written into <Persistent Volume>:\excluded\excluded_file.txt, NTFS 154 allocates a new sector to excluded_file.txt, modifies file system metadata describing the file, and writes "XYZ" into that sector. The write filter intercepts these writes, copies the contents of those sectors into the overlay file 151, and then allows those writes to modify the underlying volume 152.

After this operation, the integrity of the protected volume 150 is still guaranteed because it sees only data that it expects, and the persistent volume 153 has all the changes in the excluded file saved to the underlying volume 152. In some embodiments, the changes may be persisted so that, if desired, the changes may persist after a restart.

Continuing with FIG. 1A, when free space pass-through functionality is invoked, it is determined whether a write to the protected volume 150 will overwrite a sector that is unused in the underlying volume 152. If the target sector is unused, then the write is allowed to go to the underlying volume 152, thus conserving space in the overlay file 151. If the same sector in the underlying volume 152 will be used by persistent volume 153, the contents are copied into the overlay file 151 in order to ensure that the protected volume 150 will see the expected data.

Among many other benefits, the techniques described herein improve efficiencies with respect to configuring computing devices to repeatedly resume into a user mode operational state (e.g., computing devices implementing MICROSOFT's Hibernate Once/Resume Many (HORM) functionality, or any other similar functionality). For example, the techniques described herein enable a desired user mode operational state, that is defined prior to changes being entered, to be re-entered repeatedly even after a user has entered changes to various applications, components, and data. Furthermore, the techniques described enable a user-defined user mode operational state to be persisted, and in some embodiments, for multiple states to be defined and persisted. Thus, the described techniques improve computing efficiencies and/or human interaction with computers at least due to mitigating the burden of redefining the desired user mode operational state. The described techniques also allow for the user mode operational state to be maintained while improving the efficient utilization of the overlay area and preventing situations where the overlay area becomes full.

Figure 1B:
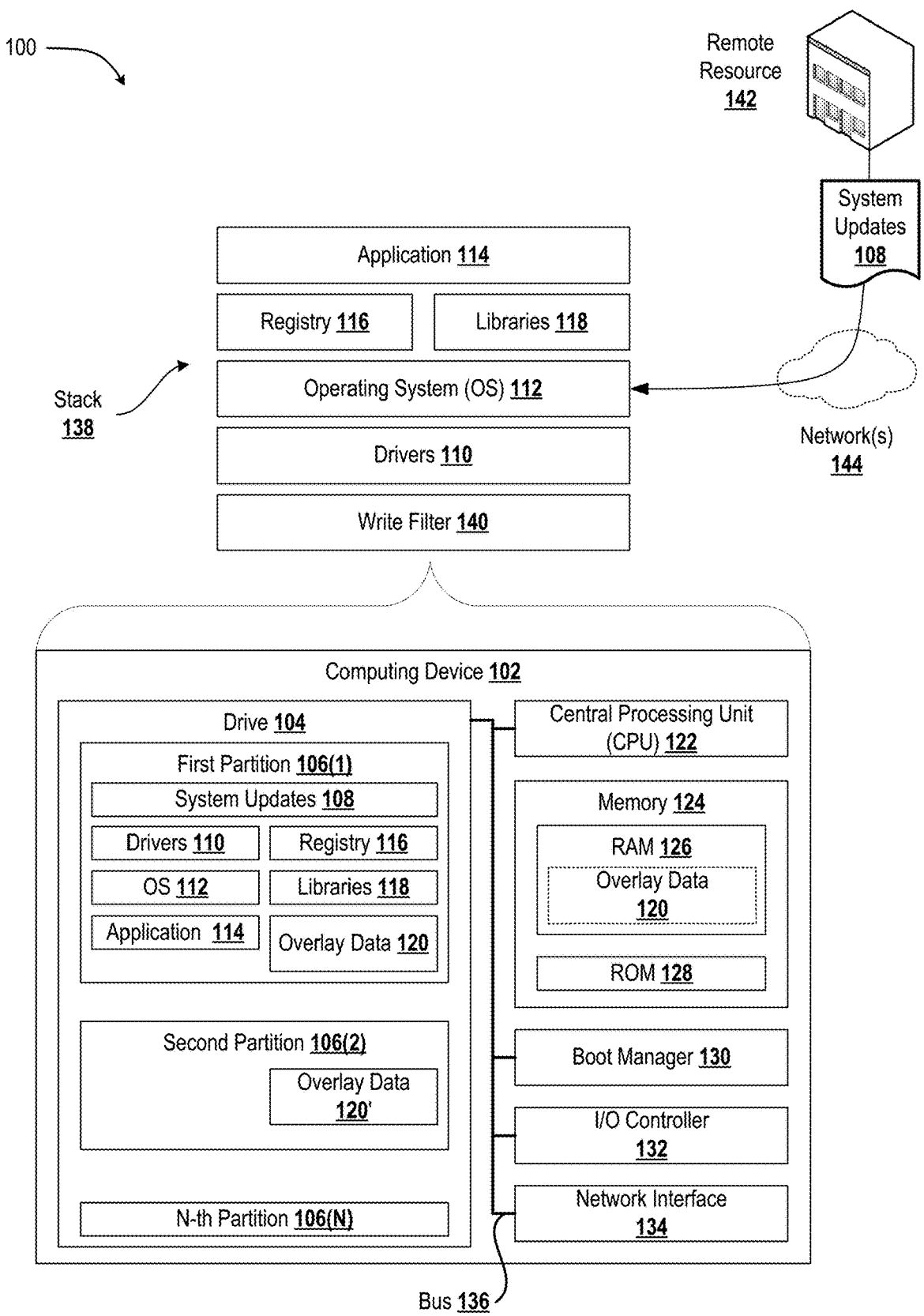
FIG. 1B is an example computing device in accordance with the present disclosure.

Turning to FIG. 1B, illustrated is an example computing system 100 for maintaining user mode operational state data 120 to maintain an ability to repeatedly enter a user mode operational state. The computing device 102 provides an ability to modify and persist the user mode operational state by updating the user mode operational state data 120.

Example system components include, but are not limited to, drivers 110, an operating system (OS) 112, an application 114, a registry 116, and/or libraries 118. The example computing system 100 enables the computing device 102 to execute any aspects of the software components and/or functionality presented herein. Furthermore, the example computing architecture 100 illustrated in FIG. 1B shows an example architecture for an industry device (e.g., a Computer Numerical Control (CNC) device deployed in a manufacturing facility, a thin client device deployed in a healthcare facility, casino-gaming devices, Human Machine Interface (HMI) devices, and/or a Point-of-Sale (POS) device deployed in a brick and mortar retail facility), a personal computer (e.g., a laptop and/or desktop computer), a tablet computer, a smart phone, a server computer, a server rack, a network of server computers, or any other types of computing devices suitable for implementing the functionality described herein.

As illustrated in FIG. 1B, the computing device 102 may include one or more drive(s) 104 (hereinafter referred to as the "drive") having computer-readable media that provides nonvolatile storage for the computing device 102. Example drives include, but are not limited to, SATA-type solid-state hard drives, SATA-type hard disks, PATA-type solid-state hard drives, PATA-type hard disks, and/or any other drive-type suitable for providing non-volatile computer-readable media to a computing device. The drive 104 may include multiple partitions 106 for logically separating one or more system components and/or data objects.

In the illustrated example, the drive 104 is separated into a first partition 106(1), a second partition 106(2), and an N-th partition 106(N). In some embodiments, at least one of the partitions 106 stores drivers 110 and an operating system (OS) 112 to enable a boot manager 130 to initiate the drivers 110 and to load the OS 112 into a memory 124. In the illustrated example, the memory 124 includes a random-access memory ("RAM") 126 and a read-only memory ("ROM") 128. As further illustrated, the computing device 102 includes a central processing unit ("CPU") 122 that is connected, via a bus 136, to the drive 104, the memory 124, and the boot manager 130. In some embodiments, the bus 136 further connects an input/output (I/O) controller 132 and/or a network interface 134.

It can be appreciated that the system components described herein (e.g., the drivers 110, the OS 112, and/or the application 114) may, when loaded into the CPU 122 and executed, transform the CPU 122 and the overall computing device 102 from a general-purpose computing system into a special-purpose computing system customized to facilitate the functionality presented herein. The CPU 122 may be constructed from any number of transistors or other discrete circuit elements, which may individually or collectively assume any number of states. More specifically, the CPU 122 may operate as a finite-state machine, in response to executable instructions contained within the software modules disclosed herein. These computer-executable instructions may transform the CPU 122 by specifying how the CPU 122 transitions between states, thereby transforming the transistors or other discrete hardware elements constituting the CPU 122.

The drive 104 and associated computer-readable media provide non-volatile storage for the computing device 102. Although the description of computer-readable media contained herein refers to a mass storage device, such as a solid-state drive and/or a hard disk, it should be appreciated by those skilled in the art that computer-readable media can be any available non-transitory computer storage media or communication media that can be accessed by a computing architecture such as, for example, the computing architecture 100. Communication media includes computer-readable instructions, data structures, and/or program modules. By way of example, and not limitation, communication media includes wired media such as a wired network or direct-wired connection. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 102. For purposes of the claims, the phrase "computer storage medium," "computer-readable storage medium," and variations thereof, does not include waves, signals, and/or other transitory and/or intangible communication media, per se.

The boot manager 130 may access the OS 112 from the drive 104 (or a partition thereof) and may load the OS 112 into the memory 124 for runtime execution by the computing device 102 (e.g., by invoking an OS boot loader). During execution of an OS booting protocol, the boot manager 130 (and/or an OS boot loader thereof) may identify the presence of (and/or verify a validity of) the user mode operational state data 120. The boot manager 130 may load the user mode operational state data 120 into the memory 124 to directly enter a predefined user mode operational state from a powered down state (e.g., to enter the predefined user mode operational state without any user actions).

The I/O controller 132 may receive and process input from a number of other devices, including a keyboard, mouse, or electronic stylus (not shown in FIG. 1B). Similarly, the I/O controller 132 may provide output to a display screen, a printer, or other type of output device (also not shown in FIG. 1B). The network interface 134 may enable the computing device 102 to connect to one or more network(s) 144 such as a local area network (LAN), a wide area network (WAN), a wireless local area network (WLAN), or any other suitable network for passing information between the computing device 102 and a remote resource 142.

As described above, the drive 104 may include multiple partitions 106 for logically separating one or more system components and/or data objects. In the illustrated example, the drive 104 includes the first partition 106(1) which stores instances of the drivers 110, the OS 112, the application 114, the registry 116, the libraries 118, and the user mode operational state data 120. The drivers 110 may include one or more programs for controlling one or more devices that are communicatively coupled to the computing device 102 such as, for example, printers, displays, cameras, soundcards, network cards, computer storage devices, etc. The OS 112 may be any suitable system software for managing computer hardware and/or software resources and for providing services to the application 114 and/or other applications (not shown). An example OS 112 may include, but is not limited to, various versions of MICROSOFT WINDOWS (e.g., WINDOWS 8.1 or 10, WINDOWS EMBEDDED STANDARD 7, etc.), Mac OS X, iOS, etc.

The application 114 may be a computer program that is configured to be run by the OS 112 to perform one or more coordinated functions, tasks, and/or activities. Example applications 114 include, but are not limited to, applications configured to support one or more specific enterprise operations (e.g., a medical application for facilitating patient management, a commercial application for facilitating POS retail transactions and/or customer service, etc.) and/or general applications (e.g., a word processor and/or spreadsheet application, a web browser application, etc.).

The registry 116 may correspond to a database containing information usable to boot and/or configure the OS 112, system-wide software settings that control the operation of the OS 112, security databases, and/or user specific configuration settings. The registry 116 may further contain information associated with in-memory volatile data such as, for example, a current hardware state of the OS 112 (e.g., which drivers are currently loaded and in use by the OS 112).

The libraries 118 may include a collection of non-volatile resources that are usable (e.g., callable) by the application 114 and/or other applications (not shown). Example resources include, but are not limited to, pre-written code and/or subroutines, configuration data, and/or classes (e.g., extensible program-code-templates for creating objects of various types). In various implementations, the libraries 118 may enable the application 114 to call upon various system services provided by the OS 112. For example, the libraries 118 may include one or more subsystem Dynamic Link Libraries (DLLs) configured for implementing and/or exposing Application Programming Interface (API) functionalities of the OS 112 to the application 114.

The user mode operational state data 120 may define a user mode operational state of the computing device 102 and/or system components thereof. As used herein, the term user mode operational state may refer to a specific "user mode" (e.g., a mode in which a user may interact with a computing device via I/O devices) operational state that is designed to support one or more specific enterprise functions (e.g., running education applications, performing POS retail transactions, etc.). The term user mode operational state may also refer to any other operational state based on changes entered by the user. From a known good state, the user mode operational state data 120 may be loaded into the memory 124 to resume the computing device 102 into the user mode operational state.

It can be appreciated, therefore, that the user mode operational state data 120 may correspond to a snapshot of states across the various system components of the computing device 102 and may include data about the drivers 110, the OS 112, and any applications that are running at the time the known good state data is recorded. Furthermore, it can be appreciated that the user mode operational state data may therefore indicate a state of function and/or a state of library. Generally, the user mode operational state data 120 corresponds to contents of the memory 124 that correspond to (e.g., result in) the user mode operational state.

For example, upon receipt of an instruction to save data defining the user mode operational state, the computing device 102 (and/or a power manager thereof) may compress contents of the memory 124 and save the compressed contents of the memory 124 to the user mode operational state data 120 (e.g., in the form of a file such as, for example, a "Hiberfil.sys" file which may be saved in a root directory of a system volume).

In configurations where the user mode operational state data 120 is stored on the drive 104, which provides non-volatile storage for the computing device 102, the computing device 102 may be fully powered down (or even abruptly lose power) without losing access to the user mode operational state data 120. When the computing device 102 is later turned on it may automatically transition to the known good state because the boot manager 130 may identify that the user mode operational state data 120 includes a valid memory image, e.g., the compressed contents of the memory 124. Then, the boot manager 130 may execute a specific booting protocol to cause the computing device 102 to reenter the user mode operational state.

For example, the boot manager 130 may launch a specific booting protocol (e.g., a "%SystemRoot%\System32\Winresume.exe") which reads the contents of the user mode operational state data 120 into the memory 124 and, ultimately, resumes runtime execution at that point in memory recorded in the user mode operational state data 120 (i.e., the user mode operational state).

In various embodiments, the computing device 102 may be configured to persist changes to the system components and/or the user mode operational state data 120 to retain an ability to enter a user mode operational state (e.g., upon being power cycled or restarted). For example, as further shown in FIG. 1B, the computing device 102 may implement a stack 138 to enable the various system components to work together to produce one or more desired results. Furthermore, the stack 138 may include a write filter 140 that receives attempted data writes that are intended for one or more of the partitions 106 (or any other designated volume of the drive 104) and reroutes these attempted data writes to a virtual overlay or some other alternate storage location.

As a more specific but nonlimiting example, the write filter 140 may be a filter driver that operates in the stack 138 just below a storage driver (e.g., included within the drivers 110) that is configured to facilitate data writing operations to the drive 104 and/or memory 124. In this example, from the perspective of the OS 112 it appears that the attempted data writes are being successfully written to the drive 104 whereas, in actuality, the state of any protected volumes of the drive 104 remaining unchanged from the time at which the user mode operational state data 120 was initially saved.

Thus, any user actions that modify an operational state the system components may be flushed from the memory 124 (or a designated volume of the drive 104 if exceptions are established). For example, upon obtaining control of the computing device 102 from the user mode operational state, a user may perform various operations which may create, edit, delete, or otherwise interact with various data stored in the memory 124. Despite the user performing these various operations, however, the computing device 102 may be caused to repeatedly reenter the user mode operational state defined by the user mode operational state data 120 and preserved by the enabled write filter.

Figure 2:
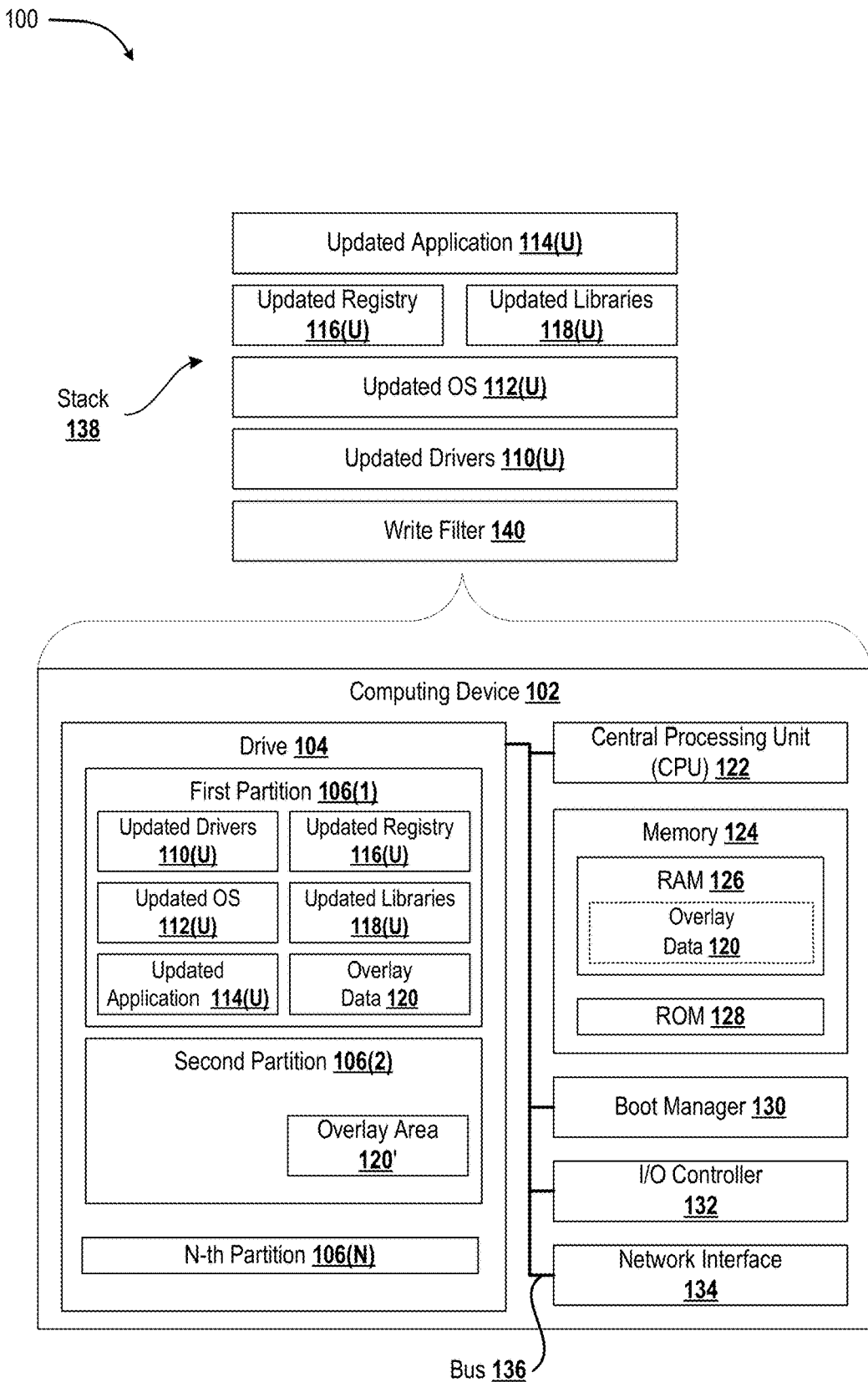
FIG. 2 is an example computing device in accordance with the present disclosure.

Turning to FIG. 2, the example computing system 100 is illustrated following the incorporation of an anchor point resulting in at least some of the system components being updated based on the saved information in the overlay 120 as of the point in time associated with the anchor point. In the illustrated example, aspects of several system components have been updated and, therefore, the first partition 106(1) is shown to include updated drivers 110(U), an updated OS 112(U), an updated application 114(U), an updated registry 116(U), and updated libraries 118(U).

In one example, the anchor point may include changes to the drivers 110. In another example, the anchor point may include changes to the OS 112. For example, aspects of the registry 116 and/or libraries 118 may have been changed. In yet another example, the anchor point may include changes to the application 114. When the anchor point is defined, the computing device 102 will now allow users to repeatedly transition the computing device 102 to the user mode operational state as defined by the anchor point when a reboot occurs. The write filter 140 will continue to allow user interaction with the OS and the applications without impacting the protected data, which now includes the changes defined by the anchor point.

It can be appreciated that MICROSOFT's Hibernate Once/Resume Many (HORM) feature may represent an example implementation of at least some of the disclosed techniques. Specifically, a computing device may be configured to always resume and restart from a last saved version of a known good state data file by deploying MICROSOFT's HORM feature in conjunction with a suitable write filter such as, for example, MICROSOFT's Unified Write Filter (UWF) and/or Enhanced Write Filter (EWF). Thus, in various implementations, the write filter 140 is configured to prevent data from being written to at least one of the first partition 106(1) or the second partition 106(2) to maintain an ability of the boot manager 130 to transition the computing device 102 between a known good state and a user mode operational state. In some implementations, the drive 104 may include at least some storage volume(s) that remain unprotected with respect to the write filter 140. For purposes of the present discussion, assume that the write filter 140 is configured to by default (e.g., in a user mode) allow writes to the N-th partition 106(N).

Figure 3:
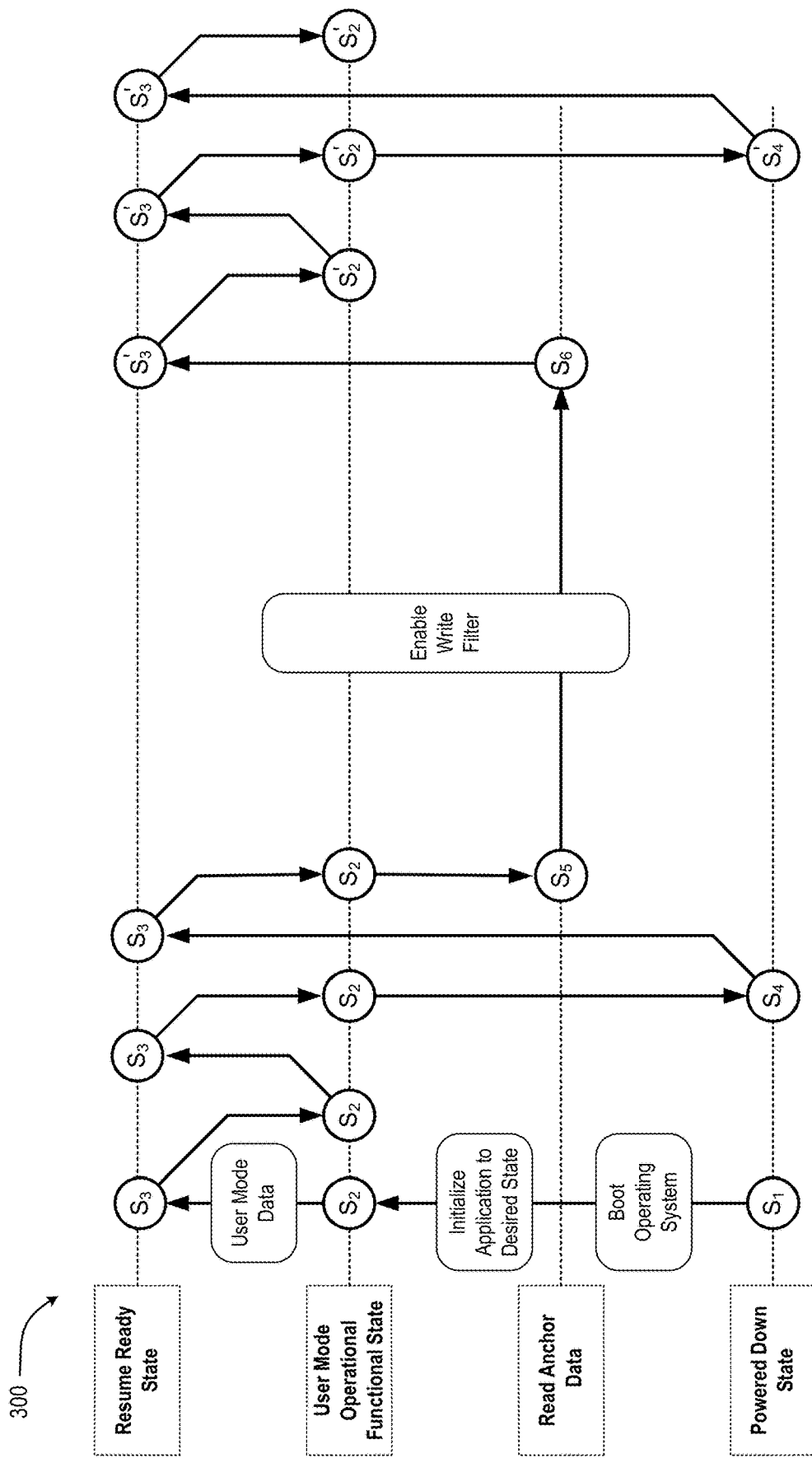
FIG. 3 is a flowchart depicting an example process flow accordance with the present disclosure.

Turning now to FIG. 3, illustrated is a pictorial flow diagram of an example process 300 during which data that defines a user mode operational state may be saved and during which updated user mode operational state data 120(U) may be generated that defines an anchor point or a rollback point.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims. It also should be understood that the illustrated methods can end at any time and need not be performed in their entireties. Some or all operations of the methods, and/or substantially equivalent operations, can be performed by execution of computer-executable instructions included on a computer-storage media, as defined herein.

At the system state S1, a computing device such as, for example, the computing device 102 is in a power down state (e.g., the computing device is completely turned off and/or a power manager is restarting the computing device) and does not have user mode operational state data 120 stored in a manner designed so to cause the boot manager 130 to automatically load a corresponding known good state file into the memory 124. For example, system state S1 may correspond to the state that the computing device 102 is in when initially received from an original equipment manufacturer (OEM) and/or the state that the computing device 102 is in when turned off according to a power down protocol.

As illustrated, between the system state S1 and the system state S2, the operating system (OS) 112 is booted which brings the computing device 102 into a "user mode" operational state. As used herein, the term "user mode" may refer generally to an operational state in which the OS 112 has been booted and control of the computing device 102 has been passed off to a user. In some instances, control of the computing device 102 may be passed off to a user at a default operational state of the OS 112. For example, in the process 300 because no user mode operational state data 120 exists at the system state S1, the boot manager 130 may pass control of the computing device 102 over to the user at the default operational state of the OS rather than a user mode operational state. For example, the default operational state may correspond to the state that the computing device 102 is in when first turned on after being received from the OEM and/or the state that the computing device 102 is in when turned on at a time when no valid user mode operational state file is saved in a designated non-volatile storage location. As described below, in some instances control of the computing device 102 may not be passed off to a user at the default operational state but rather the boot manager 130 may retain control until the computing device 102 has been resumed into the user mode operational state.

Between the system state S1 and the system state S2, the computing device 102 may receive various inputs that cause an application such as, for example, the application 114 to be initialized into the user mode operational state. For purposes of the present discussion, the user mode operational state may refer to a specific operational state during which the OS 112 is functional and operating in a user mode (e.g., a mode in which a user has been given control of the computing device 102) and during which the application 114 is in the desired operational state (e.g., as initially defined by the various inputs received between the system state $S_1$ and the system state $S_2$). Example user mode operational states include, but are not limited to, an operational state during which a Line-of-Business (LOB) application has been readied to perform a specific enterprise mission, e.g., a medical application has been readied to receive a data scan for patient management purposes, a commercial application has been readied to facilitate a POS retail transaction, etc.

In addition, between the system state $S_2$ and the system state $S_3$, user mode operational state data 120 is identified and stored. In one example, the user mode operational state data 120 is stored on a drive 104 so that upon being power cycled (e.g., turned off and then subsequently turned back on, restarted, etc.) the boot manager 130 and/or a boot loader thereof may recognize the presence of a valid memory image (e.g., stored in the form of a known good state data file) and, in response thereto, load the memory image directly into the memory 124. Additionally, between the system state $S_2$ and the system state $S_3$, write filter 140 is enabled to protect at least a volume of memory, such as the drive 104, on which the user mode operational state data 120 is stored. Stated another way, once the user mode operational state data is generated, it is saved to the drive 104 and marked read-only so that it will be preserved. Accordingly, it can be appreciated that at system state $S_3$ the computing device 102 has been placed into a known good state that can be repeatedly entered and from which the computing device 102 can resume into the user mode operational state time and time again upon being power cycled. It will further be appreciated based on the following discussion, that the system state $S'_2$, $S'_3$, and $S'_4$ are updated counterparts of the system states $S_2$, $S_3$, and $S_4$, respectively.

As illustrated, from the system state $S_3$, the computing device 102 may be caused to directly reenter the user mode operational state at $S_2$. A user may then interact with the computing device 102 to perform the specific enterprise operation that the user mode operational state is designed to facilitate. For example, a user may deploy the computing device 102 at a retail location to perform a POS transaction (e.g., selling a shirt to a consumer). Once finished, the user may cause the computing device 102 to transition back into the known good state at $S_2$ from which the computing device 102 may again resume into the user mode operational state. During this transition, data associated with the user's previous interaction may be flushed so that the user mode operational state is identical each time it is reentered.

As further illustrated, from the system state $S_2$, the computing device 102 is powered down into the system state $S_4$. For example, a user may press a power button on the computing device 102 to turn off and/or restart the computing device 102. Alternatively, the computing device 102 may crash (e.g., due to a system error). Alternatively, the computing device 102 may lose power (e.g., a power outage may occur at a manufacturing facility, a battery may run out, the computing device 102 may be inadvertently unplugged, etc.).

Between the system state $S_4$ and the system state $S_3$, the OS 112 is again booted and/or flashed to the memory 124 to bring the computing device 102 into an operational state. However, in contrast when the computing device 102 was powered on before the user mode operational state data 120 was generated and saved, control of the computing device 102 is not passed over to the user at the default operating system state. Rather, the boot manager 130 retains control of the computing device 102 (e.g., due to the presence of the saved user mode operational state data 120) until the computing device 102 is resumed into the user mode operational state. For example, upon being powered on from the system state $S_4$, the boot manager 130 may identify the presence of the valid memory image and may load that memory image into the memory 124. Then, the boot manager 130 may load the memory 124 with the image to ultimately resume runtime execution from the user mode operational state.

Activity during the user mode operational state can cause the generation of activity data which can be written to volatile memory, and such data can be flushed each time the computing device 102 transitions to the known good state.

Between the system state $S_2$ and the system state $S_5$, the computing device 102 may enter an update state (e.g., a mode in which a current state is persisted for rollback). When an updated state is persisted, future transitions to the user mode operational state at $S_2$ may now proceed to state $S'_2$. When the computing device 102 transitions from the resume ready state to the user mode operational state, the computing device 102 can utilize the persisted data.

Following the definition of a rollback point, the computing device may transition from system state $S_6$ to the state $S'_3$ that includes persisted changes.

Figure 4:
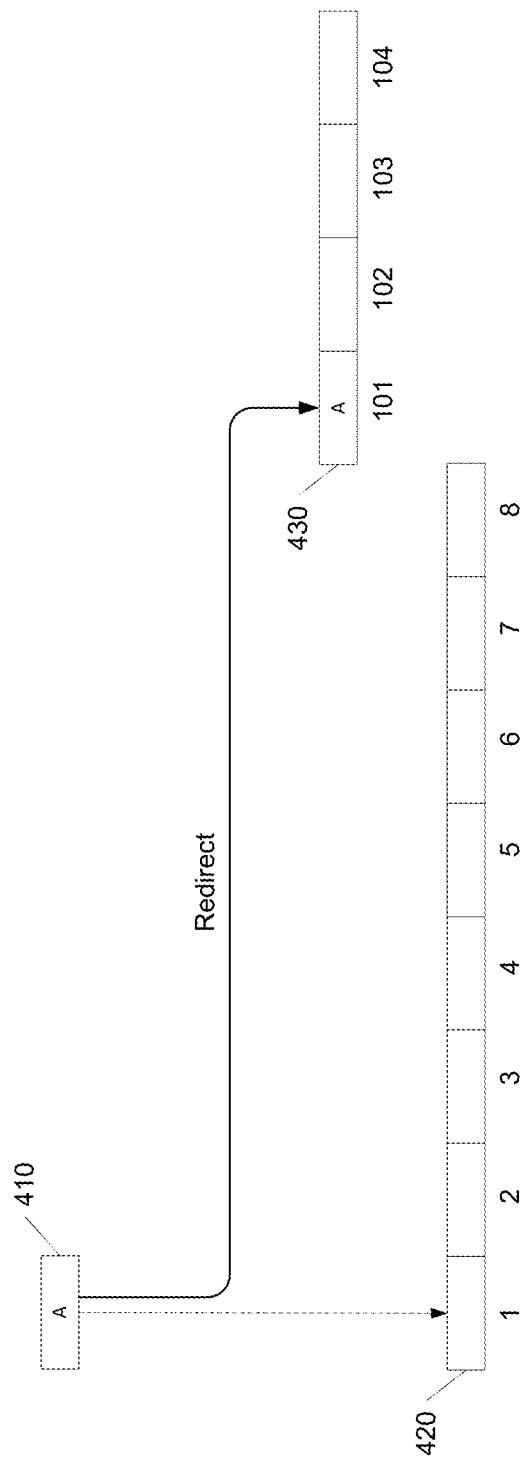
FIG. 4 is a diagram illustrating redirection in accordance with the present disclosure.

Turning to FIG. 4, illustrated is an example of redirected writes in accordance with the present disclosure. FIG. 4 depicts a block of data A 410 that is to be written to a memory block 1 of protected area 420 that includes blocks 1 through 8. Because blocks 1 through 8 are protected, the data A 410 is redirected to block 101 of overlay area 430 that includes blocks 101 through 104. Future requests to read block 1 are redirected to block 101 so that the data A 410 is "seen" to be written to block 1 of protected area 420.

Because the data written to the overlay can grow and use the available capacity as applications continue to write to protected volumes, the computing device may provide a notification to the user when available capacity is critically low. In some embodiments, the write filter may increase the available space for the overlay. The maximum size of the overlay may be allowed to grow to the size of the disk file, if space is available.

Figure 5:
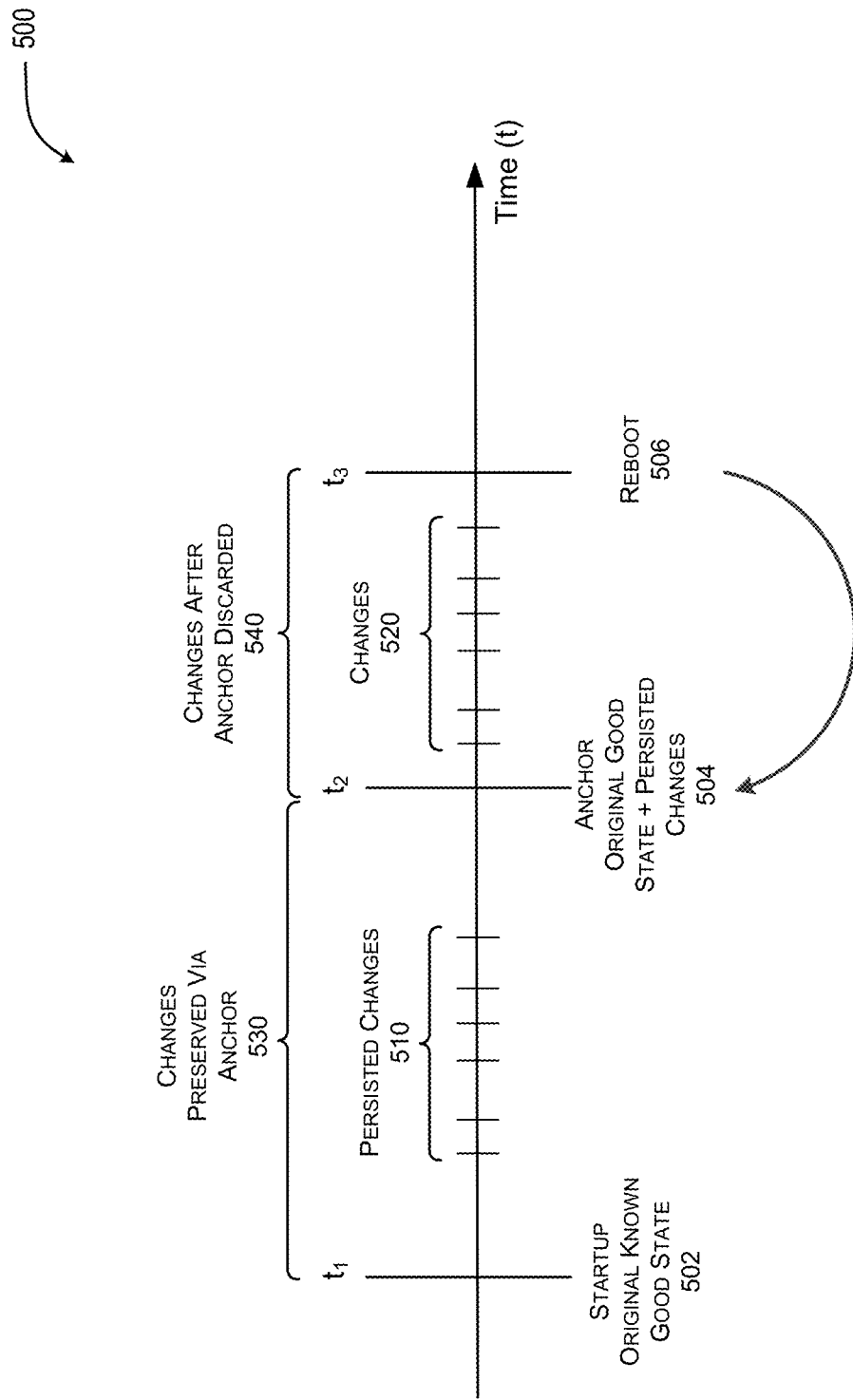
FIG. 5 is a diagram illustrating an anchor point in accordance with the present disclosure.

Turning to FIG. 5, illustrated is an example implementation of an anchor in accordance with the present disclosure. FIG. 5 depicts a timing diagram 500 illustrating start-up 502 of a device at time t1, where the device is brought to a known good state. Until time t2 when an anchor point is defined, changes may be made by a user of the device. The changes are depicted as persisted changes 510 when anchor point 520 is defined, which causes the persisted changes 510 to be made available for future reboots.

After time t2, further changes 520 on the device are not persisted when reboot 506 occurs because no new anchor points have been defined. Accordingly, in response to reboot 506, the device is brought back to the operational state defined by anchor 504, which includes the original known good state as well as the changes up to anchor 504.

As applications continue to write to protected volumes, a RAM-based overlay may use available free RAM until the overlay reaches a specified maximum size or reaches critically low levels of available RAM, which requires that the system be restarted. Because RAM is typically much more expensive than disk space, available RAM usually limits how long the computing device can operate before needing to be restarted. In a disk-based overlay, available free space in the overlay area may be used until the overlay reaches the specified maximum size for the overlay, after which system operation may be affected or the system must be restarted.

Figure 6:
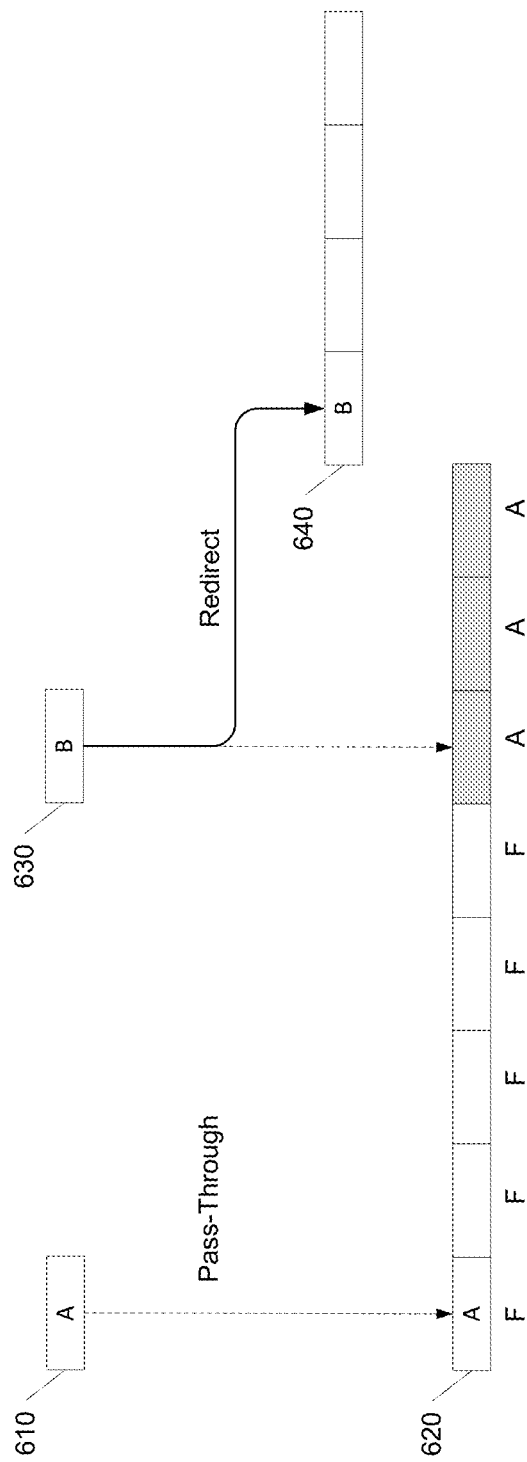
FIG. 6 is a diagram illustrating free space pass-through in accordance with the present disclosure.

Turning to FIG. 6, illustrated is an example of overlay pass-through in accordance with the present disclosure. FIG. 6 depicts a block of data A 610 that is to be written to a memory block of protected area 620 that includes free blocks denoted by 'F' and allocated blocks denoted by 'A'. The free/allocated information may be accessed, for example, from the file system. Because block A 610 is to be written to a free block, block A is allowed to be written directly to the block. Data B 630, on the other hand, is to be written to an allocated block. Because block B 630 is to be written to an allocated block of a protected area, block B 630 is redirected to overlay area 640. Future requests to read block B 630 are redirected to overlay 640 so that the data B 630 is "seen" to be written to protected area 620.

In some embodiments, the free space pass-through mechanism may be enabled by default in disk overlay mode, and disabled by default in RAM overlay mode.

Figure 7:
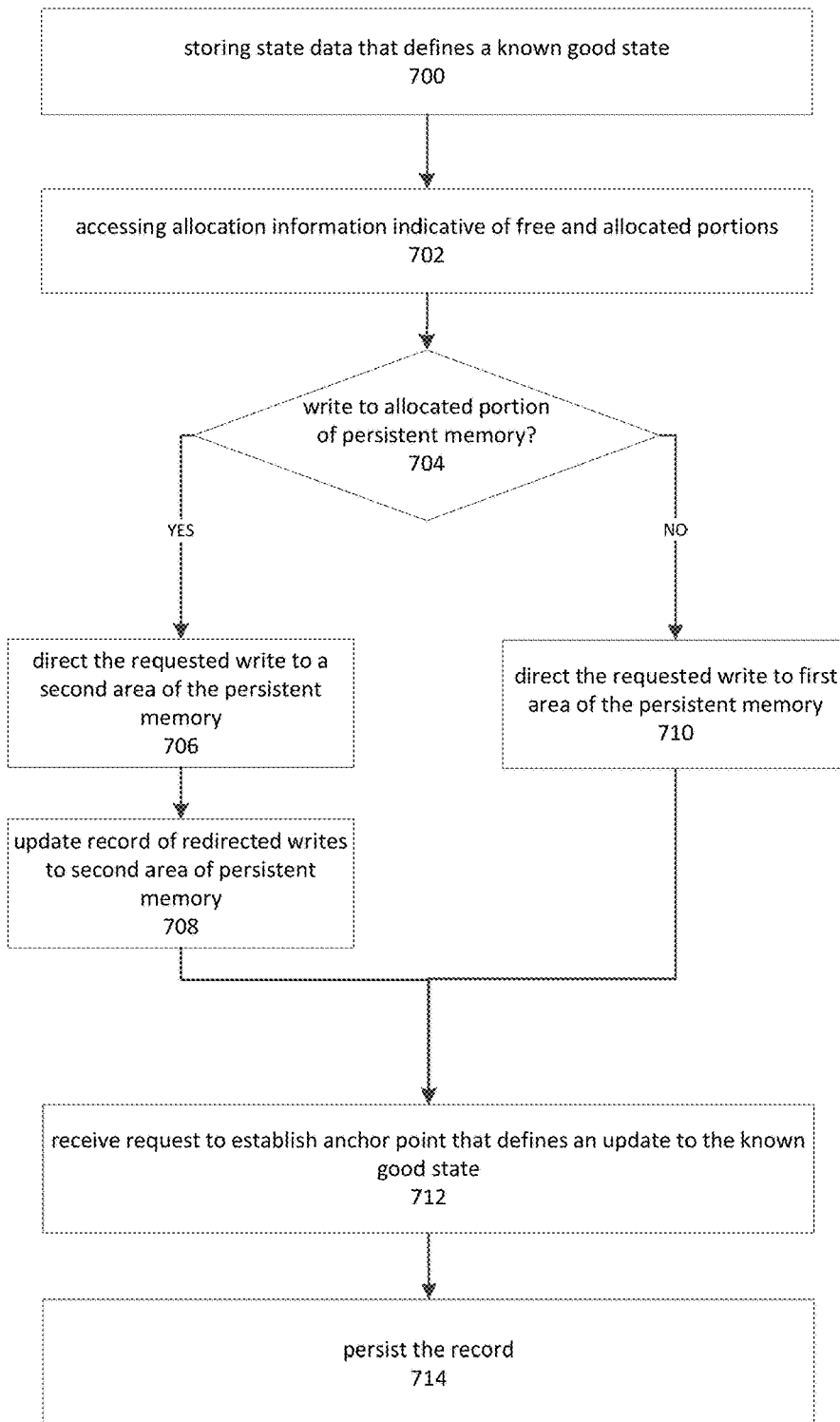
FIG. 7 is a flowchart depicting an example procedure for implementing techniques in accordance with the present disclosure.
Figure 8:
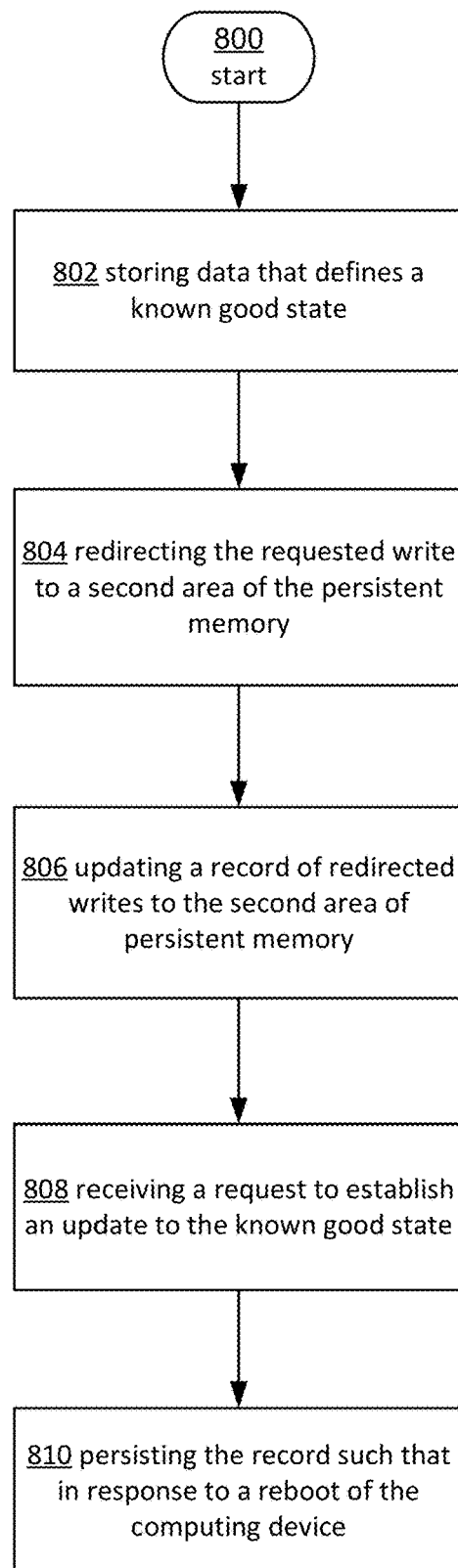
FIG. 8 is a flowchart depicting an example procedure for implementing techniques in accordance with the present disclosure.
Figure 9:
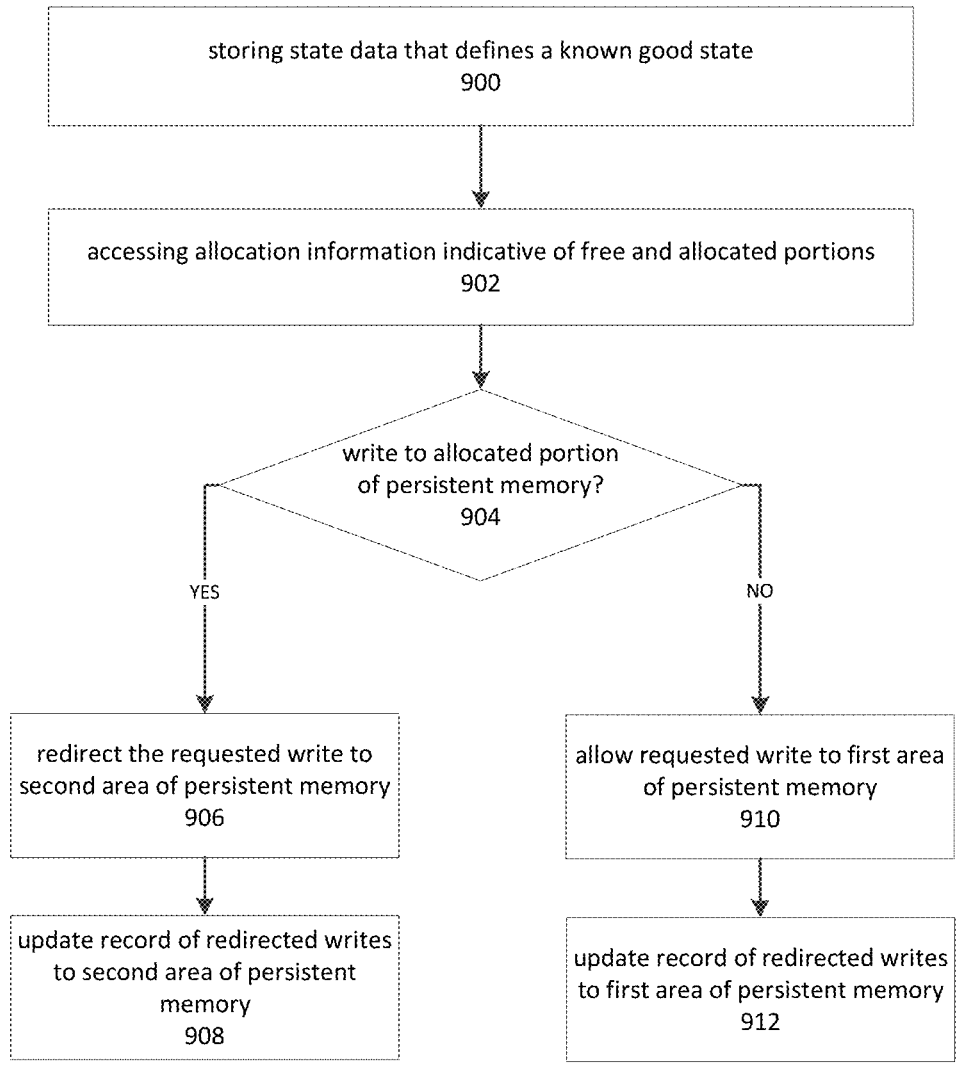
FIG. 9 is a flowchart depicting an example procedure for implementing techniques in accordance with the present disclosure.

Referring to FIG. 7, illustrated is an example operational procedure in accordance with the present disclosure. Referring to FIG. 7, Operation 700 illustrates storing in a first area of a persistent memory of a computing device, state data that defines a known good state. In an embodiment, the state data is operable to launch the computing device to the known good state in response to a reboot of the computing device. In one embodiment, a write filter as described herein may be implemented to store the changes to the known good state. The write filter may be configured to intercept all modifications to any sector or other unit on a protected volume. Any time the file system attempts to modify a protected sector, the write filter instead copies the sector from the protected volume to the overlay, and going forward modifies the overlay instead of the original destination. If an application attempts to read from that sector, the write filter returns the data from the overlay instead, so that the system maintains the appearance of having written to the volume, while the volume remains unchanged.

Operation 700 may be followed by Operation 702. Operation 702 illustrates accessing an allocation table indicative of free and allocated portions of the persistent memory. Operation 702 may be followed by Operation 704. Operation 704 illustrates in response to a write request to the first area of persistent memory, determining when the write request is to an allocated portion of the persistent memory. If the write request is to an allocated portion of the persistent memory, operation 704 may be followed by Operation 706. Operation 706 illustrates redirecting the requested write to a second area of the persistent memory. Operation 706 may be followed by Operation 708. Operation 708 illustrates updating a record of redirected writes to the second area of persistent memory. In an embodiment, the record is stored in the second area.

If the write request is to a free portion of the persistent memory, operation 704 may be followed by operation 710. Operation 710 illustrates allowing the write request to be executed in the second area of persistent memory.

Operations 708 and 710 may be followed by operation 712. Operation 712 illustrates receiving a request to establish an anchor point that defines an update to the known good state, wherein the anchor point is operable to launch the computing device to the updated known good state in response to a reboot of the computing device. Operation 712 may be followed by Operation 714. Operation 714 illustrates in response to the request to establish the anchor point, persisting the record such that in response to a reboot of the computing device, the record is usable to restore the redirected writes, thereby launching the computing device to the updated known good state.

The disclosure presented herein may be considered in view of the following clauses.

Example Clause A, a computer-implemented method comprising:
storing in a first area of a persistent memory of a computing device, state data that defines a known good state that is operable to launch the computing device to the known good state in response to a reboot of the computing device;
accessing allocation information indicative of free and allocated portions of the persistent memory;
in response to a write request to a first area of persistent memory:
when the write request is to an allocated portion of the persistent memory:
redirecting the requested write to a second area of persistent memory; and
updating a record of redirected writes to the second area of persistent memory;
when the write request is to a free portion of the persistent memory:
allowing the write request to be executed in the first area of persistent memory; and
updating the record of redirected writes with the writes to the first area of persistent memory.

Example Clause B, the computer-implemented method of Example Clause A, wherein the second area of the persistent memory is a predefined overlay area.

Example Clause C, the computer-implemented method of any one of Example Clauses A through B, wherein the record comprises an index of translations between the original writes to the first area and corresponding redirects to the second area.

Example Clause D, the computer-implemented method of any one of Example Clauses A through C, wherein the record further comprises an index of the writes executed in the first area of persistent memory.

Example Clause E, the computer-implemented method of any one of Example Clauses A through D, further comprising in response to a reboot, accessing the record and restoring mappings to the second area and writes to the first area.

Example Clause F, the computer-implemented method of any one of Example Clauses A through E, further comprising in response to the reboot, accessing the record and restoring the record of writes to the first area.

Example Clause G, the computer-implemented method of any one of Example Clauses A through F, wherein the record is stored in the second area.

Example Clause H, the computer-implemented method of any one of Example Clauses A through G, wherein in response to a reboot, discarding mappings to the second area and the record of writes to the first area and reverting to the known good state.

Example Clause I, the computer-implemented method of any one of Example Clauses A through H, wherein discarding comprises treating the mappings as uninitialized.

Example Clause J, the computer-implemented method of any one of Example Clauses A through I, wherein the first area is a protected volume of the computing device Example Clause K, a computing device comprising:
one or more processors;
a memory in communication with the one or more processors, the memory having computer-readable instructions stored thereupon which, when executed by the one or more processors, cause the computing device to invoke an operational state of the computing device communicatively coupled to a persistent memory, the operational state configuring the computing device to:
persist in a first area of the memory, data indicative of a known good state that is operable to launch the computing device to the known good state in response to a reboot of the computing device;
in response to a write request to the first area of memory:
when the write request is to an allocated portion of the memory:
redirect the requested write to a second area of the memory; and
when the write request is to a free portion of the memory:
allow the write request to be executed in the first area of memory.

Example Clause L, the computing device of Example Clause K, wherein the operational state is implemented by a write filter.

Example Clause M, the computing device of any one of Example Clauses K through L, wherein the second area of the memory is a predefined overlay area.

Example Clause N, the computing device of any one of Example Clause K through M, further comprising updating a record of redirected writes to the second area and allowed writes to the first area.

Example Clause O, the computing device of any one of Example Clauses K through N, further comprising in response to a reboot, accessing the record and restoring mappings to the first and second areas.

Example Clause P, the computing device of any one of Example Clauses K through O, wherein mappings are treated as uninitialized in order to launch the computing device to the known good state in response to a reboot of the computing device.

Example Clause Q, a computing device comprising:
one or more processors;
a memory in communication with the one or more processors, the memory having computer-readable instructions stored thereupon which, when executed by the one or more processors, cause the computing device to invoke an operational state of a computing device communicatively coupled to a persistent memory, the operational state configuring the computing device to:
store in a first area of the persistent memory, data that is operable to launch the computing device to a known good state in response to a reboot of the computing device;
in response to a write request to the first area of persistent memory:
when the write request is to an allocated portion of the persistent memory:
redirect the requested write to a second area of the persistent memory; and
update a record comprising redirected writes to the second area of persistent memory; and
when the write request is to a free portion of the persistent memory:
allow the write request to be executed in the first area of persistent memory; and
update the record with executed writes to the first area of persistent memory.

Example Clause R, the computing device of Example Clause Q, further comprising in response to a reboot, accessing the record and restoring the record of writes to the first area and mappings to the second area.

Example Clause S, the computing device of any one of Example Q through R, wherein in response to a reboot, treating mappings as uninitialized and reverting to the known good state.

Example Clause T, the computing device of any one of Example Clauses Q through S, wherein the first area is a protected volume of the computing device.

Example Clause U, a computing device comprising:
one or more processors;
a memory in communication with the one or more processors, the memory having computer-readable instructions stored thereupon which, when executed by the one or more processors, cause the computing device to invoke an operational state of a computing device communicatively coupled to a persistent memory, the operational state configuring the computing device to:
store in a first area of the persistent memory, state data that defines a known good state that is operable to launch the computing device to the known good state in response to a reboot of the computing device;
access an allocation table indicative of free and allocated portions of the persistent memory;
in response to a write request to the first area of persistent memory:
when the write request is to an allocated portion of the persistent memory:
redirect the requested write to a second area of the persistent memory; and
update a record of redirected writes to the second area of persistent memory, the record stored in the second area; and
when the write request is to a free portion of the persistent memory:
allow the write request to be executed in the first area of persistent memory.

Example Clause V, the computing device of Example Clause U, wherein the operational state further configures the computing device to:
receive a request to define an anchor point that defines a modification to the known good state, wherein the anchor point is operable to launch the computing device to the modified known good state in response to a reboot of the computing device; and
in response to the request to define the anchor point, persisting the record such that in response to a reboot of the computing device, the record usable to restore the redirected writes, thereby launching the computing device to the known good state with the modification indicated by the redirected writes.

Example Clause W, a computer-implemented method comprising:
storing in a first area of a persistent memory of a computing device, data that defines a known good state that is operable to launch the computing device to the known good state in response to a reboot of the computing device;
in response to a write request to the first area of persistent memory:
redirecting the requested write to a second area of the persistent memory; and
updating a record of redirected writes to the second area of persistent memory;
receiving a request to establish an update to the known good state, wherein the updated known good state is operable to launch the computing device to the updated known good state in response to a reboot of the computing device; and in response to the request to establish the updated known good state, persisting the record such that in response to a reboot of the computing device, the record is usable to restore the redirected writes, thereby launching the computing device to the updated known good state.

Example Clause X, the computer-implemented method of Example Clause V, further comprising establishing a plurality of updated known good states.

Example Clause Y, the computer-implemented method of any one of Example Clauses W through X, wherein the second area of the persistent memory is a predefined overlay area.

Example Clause Z, the computer-implemented method of any one of Example Clauses W through Y, wherein the record comprises an index of translations between the requested writes to the first area and corresponding redirects to the second area.

Example Clause AA, the computer-implemented method of any one of Example Clauses W through Z, further comprising in response to a reboot, accessing the record and restoring mappings to the second area.

Example Clause BB, the computer-implemented method of any one of Example Clauses W through AA, wherein the record is stored in the second area.

Example Clause CC, the computer-implemented method of any one of Example Clauses W through BB, wherein when the updated known good state is to be cancelled, in response to a reboot, discarding mappings to the second area and reverting to the known good state.

Example Clause DD, the computer-implemented method of any one of Example Clauses W through CC, wherein discarding comprises treating the mappings as uninitialized.

Example Clause EE, the computer-implemented method of any one of Example Clauses W through DD, wherein the first area is a protected volume of the computing device.

Example Clause FF, the computer-implemented method of any one of Example Clauses W through EE, wherein the redirecting is implemented by a write filter.

Example Clause GG, a computing device comprising:
one or more processors;
a memory in communication with the one or more processors, the memory having computer-readable instructions stored thereupon which, when executed by the one or more processors, cause the computing device to:
store in a first area of persistent memory, data that defines a known good state that is operable to launch the computing device to the known good state in response to a reboot of the computing device;
in response to a write request to the first area of persistent memory:
  redirect the requested write to a second area of the persistent memory; and
  update a record of redirected writes to the second area of persistent memory; and in response to a request to define an anchor point that defines a modification to the known good state, wherein the anchor point is operable to launch the computing device to the modified known good state in response to a reboot of the computing device, persisting the record such that in response to a reboot of the computing device, the record is usable to restore the redirected writes, thereby launching the computing device to the known good state with the modifications indicated by the redirected writes.

Example Clause HH, the computing device of Example Clause GG, further comprising establishing a plurality of updated known good states.

Example Clause II, the computing device of any one of Example Clauses GG through HH, wherein the redirect is implemented by a write filter Example Clause JJ, the computing device of any one of Example Clauses GG through II, wherein the second area of the memory is a predefined overlay area.

Example Clause KK, the computing device of any one of Example Clauses GG through JJ, further comprising updating a record of redirected writes to the second area of memory.

Example Clause LL, the computing device of any one of Example Clauses GG through KK, further comprising in response to a reboot, accessing the record and restoring mappings to the second area.

Example Clause MM, the computing device of any one of Example Clauses GG through LL, wherein mappings are treated as uninitialized in order to launch the computing device to the known good state in response to a reboot of the computing device.

Example Clause NN, a computer-implemented method comprising:
storing in a first area of a persistent memory of a computing device, a known good state comprising data operable to launch the computing device to the known good state in response to a reboot of the computing device;
in response to a write request to the first area of persistent memory:
  redirecting the requested write to a second area of the persistent memory; and
  updating a record of redirected writes to the second area of persistent memory;
receiving a request to update the known good state, the update comprising data operable to launch the computing device to the updated known good state in response to a reboot of the computing device; and
in response to the request to the known good state, persisting the record such that in response to a reboot of the computing device, the record is usable to restore the redirected writes, thereby launching the computing device to the updated known good state.

Example Clause OO, the computer-implemented method of Example Clause NN, further comprising establishing a plurality of updates to the known good state.

Example Clause PP, the computer-implemented method of any one of Example Clauses NN through OO, wherein the second area of the persistent memory is a predefined overlay area.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be

What is claimed is:

1. A computer-implemented method comprising:
storing in a first area of a persistent memory of a computing device, state data that defines a known good state that is operable to launch the computing device to the known good state in response to a reboot of the computing device;
accessing allocation information indicative of free portions of the persistent memory and allocated portions of the persistent memory;
in response to a write request to the first area of persistent memory:
when the write request is to an allocated portion of the first area of the persistent memory:
redirecting the write request to a second area of persistent memory;
and updating recording the write request in a record of redirected writes to the second area of persistent memory;
when the write request is to a free portion of the first area of the persistent memory:
allowing the write request to be executed in the first area of persistent memory;
and recording the write request in updating the record of redirected writes with the writes to the first area of persistent memory;
and using the record to restore writes to the first and second areas of persistent memory in response to a restart of the computing device.

2. The computer-implemented method of claim 1, wherein the second area of the persistent memory is a predefined overlay area.

3. The computer-implemented method of claim 1, wherein the record comprises an index of translations between the original writes to the first area and corresponding redirects to the second area.

4. The computer-implemented method of claim 3, wherein the record further comprises an index of the writes executed in the first area of persistent memory.

5. The computer-implemented method of claim 1, wherein the record comprises mappings of the write requests to the second area, further comprising in response to a reboot, accessing the record and restoring the mappings to the second area.

6. The computer-implemented method of claim 5, further comprising in response to the reboot, accessing the record and restoring the record of writes to the first area and the redirected writes to the second area.

7. The computer-implemented method of claim 1, wherein the record is stored in the second area.

8. The computer-implemented method of claim 1, wherein the record comprises mappings of the write requests to the second area, further comprising in response to a reboot, discarding mappings to the second area and reverting to the known good state.

9. The computer-implemented method of claim 8, wherein discarding comprises treating the mappings as uninitialized.

10. The computer-implemented method of claim 1, wherein the first area is a protected volume of the computing device.

11. A computing device comprising:
one or more processors;
a memory in communication with the one or more processors, the memory having computer-readable instructions stored thereupon which, when executed by the one or more processors, cause the computing device to invoke an operational state of the computing device communicatively coupled to a persistent memory, the operational state configuring the computing device to:
persist in a first area of the memory, data indicative of a known good state that is operable to launch the computing device to the known good state in response to a reboot of the computing device;
in response to a write request to the first area of memory:
when the write request is to an allocated portion of the first area of memory:
redirect the requested write to a second area of the memory;
and when the write request is to a free portion of the first area of memory:
allow the write request to be executed in the first area of memory;
update a record of redirected writes to the second area of memory and allowed writes to the first area of memory; and
in response to a reboot, accessing the record and restoring the mappings to the first and second areas.

12. The computing device of claim 11, wherein the operational state is implemented by a write filter.

13. The computing device of claim 11, wherein the second area of the memory is a predefined overlay area.

14. The computing device of claim 11, wherein the record comprises mappings of write requests to the first and second areas, further comprising in response to a reboot, accessing the record and restoring the mappings to the first and second areas.

15. The computing device of claim 11, wherein mappings are treated as uninitialized in order to launch the computing device to the known good state in response to a reboot of the computing device.

16. A computing device comprising:
one or more processors;
a memory in communication with the one or more processors, the memory having computer-readable instructions stored thereupon which, when executed by the one or more processors, cause the computing device to invoke an operational state of a computing device communicatively coupled to a persistent memory, the operational state configuring the computing device to:
store in a first area of the persistent memory, data that is operable to launch the computing device to a known good state in response to a reboot of the computing device;
in response to a write request to the first area of persistent memory:
when the write request is to an allocated portion of the persistent memory:
redirect the requested write request to a second area of the persistent memory;
and record the write request in a record comprising writes to the first and second areas of persistent memory;
and when the write request is to a free portion of the persistent memory:
allow the write request to be executed in the first area of persistent memory;
and record the write request in the record with executed writes to the first area of persistent memory; and
in response to a reboot, accessing the record and restoring the record of writes to the first area and writes to the second area.

17. The computing device of claim 16, wherein the record comprises mappings of writes to the second area, further comprising in response to a reboot, accessing the record and restoring mappings to the second area.

18. The computing device of claim 16, wherein the record comprises mappings of writes to the second area, wherein in response to a reboot, treating the mappings as uninitialized and reverting to the known good state.

19. The computing device of claim 16, wherein the first area is a protected volume of the computing device.

* * * * *